United States Patent [19]
Maltsev et al.

[11] Patent Number: 5,877,486
[45] Date of Patent: Mar. 2, 1999

[54] METHOD AND APPARATUS FOR ENHANCING RESOLUTION OF REFLECTANCE SIGNALS PRODUCED FROM MACHINE-READABLE SYMBOLS

[75] Inventors: Pavel A. Maltsev, Edmonds; H. Sprague Ackley, Seattle, both of Wash.

[73] Assignee: Intermec IP Corp., Everett, Wash.

[21] Appl. No.: 730,474

[22] Filed: Oct. 11, 1996

[51] Int. Cl.⁶ .................................................. G06K 7/10
[52] U.S. Cl. ........................................ 235/462; 235/454
[58] Field of Search ................................ 235/462, 454, 235/463

[56] References Cited

U.S. PATENT DOCUMENTS

| | | | |
|---|---|---|---|
| 4,687,942 | 8/1987 | Takagi et al. | 250/556 |
| 4,916,298 | 4/1990 | Raphaël | 235/463 |
| 5,097,263 | 3/1992 | Delpech et al. | 341/155 |
| 5,276,315 | 1/1994 | Surka | 235/462 |
| 5,376,780 | 12/1994 | Klueter | 235/462 |
| 5,389,770 | 2/1995 | Ackley | 235/462 |
| 5,486,689 | 1/1996 | Ackley | 235/463 |
| 5,504,318 | 4/1996 | Joseph et al. | 235/462 |
| 5,514,858 | 5/1996 | Ackley | 235/462 |
| 5,539,191 | 7/1996 | Ackley | 235/462 |

*Primary Examiner*—F. L. Evans
*Attorney, Agent, or Firm*—Seed and Berry LLP

[57] ABSTRACT

A method and apparatus scans or images a machine-readable symbol to produce several reflectance profiles therefrom. The profiles are averaged to produce an averaged profile. Weighted coefficients for each profile are then computed based on the averaged profile. Using the weighted coefficients, a weighted profile from each of the profiles is then produced. Low pass filtering is applied to the weighted profile to filter noisy or gray level signals therefrom. The resulting filtered profile is transformed using a non-linear technique to enhance high amplitude signals, but suppress low amplitude signals. The resulting transform signal is stretched over the range of reflectance values. The resulting stretched signal is then decoded using, for example, techniques for decoding profiles that fail to resolve narrow (1-wide) elements in the machine-readable symbol.

37 Claims, 5 Drawing Sheets

METHOD AND APPARATUS FOR ENHANCING RESOLUTION OF REFLECTANCE SIGNALS PRODUCED FROM MACHINE-READABLE SYMBOLS

TECHNICAL FIELD

The present invention relates to methods and apparatus for improving the ability to decode machine-readable symbols.

BACKGROUND OF THE INVENTION

Bar code scanners and wand-based readers ("readers") scan and decode typical bar codes from linear symbologies. "Linear symbologies" are symbologies where data is encoded as parallel arrangements of alternating, multiple-width bars and spaces (e.g., U.P.C., Code 39, Code 93, etc.). Linear symbologies, as well as other symbologies, encode "data characters" (i.e., human-readable characters) as "symbol characters," which are typically alternating bars and spaces. In typical linear symbologies, such as Code 39, each bar and space, or "element," in the symbol is one of four narrow and wide elements: a single-width bar, a single-width space, a double-width bar or a double-width space. More complex linear or stacked symbologies employ a greater number of widths for each element.

Bar code readers typically convert symbol characters to data characters by scanning an area to produce a reflectance signal or bar code "profile" that is generally an analog signal representing the modulated light reflected from areas of high reflectance or "spaces," and absorbed by areas of low reflectance or "bars." As a result, the profile represents the pattern of bars and spaces, or "elements," in the symbol. In a given profile, a peak corresponds to a space (high reflectivity), while a valley corresponds to a bar (low reflectivity), relative to the space). The width of each peak or valley generally indicates the width of the corresponding bar or space whose reflectance produced the peak or valley.

Many bar code readers employ "wave shaping" circuits that essentially square off the profile based on transitions or vertical edges between the peaks and valleys in the profile. Counting circuits then produce a series of counts that indicate the horizontal widths of the bars and spaces from the linear bar code symbol. A typical locating algorithm in the reader locates a bar code symbol by examining the series of counts to attempt to find a quiet zone and an adjacent start/stop symbol character. A "quiet zone" is a clear space, containing no dark marks, that precedes or follows a symbol, often next to a start or stop character. "Start and stop characters" are symbol characters, unique to a given symbology, that indicate the beginning and end of a given symbol, respectively. Typically, a quiet zone has a size that is about ten times greater than bars that precede or follow the quiet zone. Therefore, the reader examines a series of counts and attempts to find a count that is approximately ten times greater than a count which follows thereafter. Once the quiet zone and adjacent start/stop character have been located, standard decode algorithms are employed to decode series of counts from the symbol into data characters.

Wand-type readers contact the surface on which the bar code is printed. Such readers often produce profiles having sharp contrast between the peaks and valleys and thus the spaces and bars represented by the profile are easily detectable by circuitry in the reader. However, wand-type readers require the wand to contact the surface on which the bar code is printed, and are thus impractical in situations where a user cannot or does not wish to physically contact the bar code. Requiring the user to manually contact each bar code is time consuming and reduces productivity.

Non-contact bar code readers are currently available such as laser scanning and linear charge-coupled device ("CCD") readers. Laser scanning-type readers employ a scanning beam of laser light which impinges on and is reflected from a bar code. A photodetector receives the reflected light and converts it into a modulated electrical signal that comprises the profile for the bar code.

Wand-based readers and laser scanners are often adequate to scan and decode linear symbologies. However, newer data collection symbologies have departed from the typical linear symbologies to create stacked or area symbologies in order to increase "information density," i.e., the amount of information encoded within a given area. "Stacked symbologies," or multi-row symbologies, employ several adjacent rows of multiple-width bars and spaces (e.g., Code 49, PDF417, etc.). "Area symbologies" or two-dimensional matrix symbologies, employ arrangements of regular polygon-shaped data cells where the center-to-center distance of adjacent data cells is uniform (e.g., MaxiCode, Code One, Data Matrix, Aztec Code, etc.).

Such stacked and area symbologies typically require image or vision-based readers that produce two-dimensional images of a field of view. Image or vision-based readers employ two-dimensional semiconductor arrays, vidicons, or other suitable light receiving elements that receive an image of a bar code and, based on the light reflected therefrom, process the image to produce the profile.

Due to optical system limitations inherent in laser- or image-type readers, these readers have a specified depth-of-field within which bar codes can be read. Some laser- or image-type readers employ autofocus systems to increase the depth-of-field for the reader. However, even readers with autofocus systems are limited by the depth-of-field of the autofocus system. Additionally, autofocus systems are costly, slow and have significant power requirements compared with other electronics in hand-held readers.

If a reader scans or images a bar code out of its depth-of-field, the resulting profile will exhibit "closure." Positive ink spread in a bar code or excessive noise in a profile can also produce closure. Closure in a bar code profile is evidenced by some recognizable peaks and valleys, but also ripples in the middle of the profile. Closure in a bar code profile generally indicates that the wide elements in the profile are resolved, but that the narrow elements are unresolved. With respect to readers, a space or bar is "resolved" if the reader is able to identify a peak or valley in the profile that corresponds to the given space or bar. Some profiles may represent narrow elements by small peaks, valleys or ripples that are visually recognizable, but which are essentially undetectable by current readers Currently available readers are unable to decode profiles having closure. As noted above, these readers typically employ wave shaping circuits to find the edges of bar code elements represented in a profile. To decode each element in the bar code, these electronic circuits locate an edge of an element as a point where, for example, the reflectance in the profile reaches a fixed distance from a peak or valley. Currently available readers cannot decode profiles where the narrow elements are out-of-focus or lost in the profile (i.e., profile closure) because the narrow elements fail to produce any significant peaks or valleys and thus the wave shaping circuitry is unable to locate any edges in the profile corresponding to these elements. Since current wave shaping circuits cannot locate the narrow elements in a profile when closure occurs, the circuits cannot decode the bar code.

Due to the shortcomings of such circuits, a user of a hand-held non-contact reader without autofocus must adjust the distance at which the user holds the reader from the bar code until the bar code is within the depth-of-field (i.e., in-focus) for the reader. Once in-focus, the circuitry can decode the bar code. If a user is attempting to read bar codes at varying distances, the user must constantly move the reader to place a given bar code within the focus for the reader so as to read that bar code. Consequently, while non-contact readers eliminate the need to contact the surface on which the bar code is printed, reading each bar code is still time consuming since the user must move the reader to a specific in-focus position for the reader. Further problems occur when the reader is mounted in a fixed location (and lacks autofocus capabilities), and bar codes to be read pass by the reader at different distances. For example, when the reader is mounted above a conveyor on which boxes of varying heights are carried, and the reader attempts to read bar codes atop the boxes, only those bar codes within the reader's fixed depth-of-field will be decoded. Also, when a user attempts to read an X-dimension that is below the capability of the reader, closure results and the symbol is unreadable by normal methods.

SUMMARY OF THE INVENTION

Under the present invention, the profile from a laser scanner or sampling path through a stored image of a symbol is preferably sampled numerous times to generate a series of similar profiles, each slightly different, yet all limited in reflectance resolution. The present invention can align major features (e.g., wide elements), and then combine the profiles in a non-linear manner to produce an enhanced resolution profile with smooth curves and greater apparent contrast between resolved and unresolved elements. The resultant profiles are substantially similar to high resolution profiles, even though the original profiles were generated by less sophisticated or lower resolution readers.

An exemplary method and apparatus under the present invention scans or images a machine-readable symbol to produce several reflectance profiles therefrom. The profiles can be averaged to produce an averaged profile. Weighted coefficients for each profile can be computed based on the averaged profile. Using the weighted coefficients, a weighted profile based on the profiles can then be produced. Low pass filtering can be applied to the weighted profile to filter noisy or gray level signals therefrom. The resulting filtered profile can be transformed using a non-linear technique to enhance high amplitude signals, but suppress low amplitude signals. The resulting transform signal can then be stretched over the range of reflectance values. The resulting stretched signal is then decoded using, for example, techniques for decoding profiles that fail to resolve narrow (1-wide) elements in the machine-readable symbol.

As represented in the claims below, the present invention, in a broad sense, embodies a method of decoding a data collection, machine-readable symbol representing encoded information. The symbol includes a plurality of selectively spaced shapes, the shapes and spaces between the shapes having at least wide and narrow widths in at least one dimension.

The method includes the steps of (a) producing a plurality of reflectance signals based on light reflected from the symbol, the plurality of reflectance signals having valleys and peaks that represent the reflectance of the shapes and spaces comprising the symbols; (b) producing an enhanced resolution profile based on the plurality of profiles; (c) transforming the enhanced resolution profile to exaggerate the peaks and valleys that represent the shapes and spaces comprising the symbol, to produce a transformed profile; and (d) decoding the information encoded in the symbol based on the transformed profile.

Other features and associated advantages of the present invention will become apparent from studying the following detailed description, together with the accompanying drawings.

DETAILED DESCRIPTION OF PRESENTLY PREFERRED EMBODIMENTS OF THE INVENTION

A signal processing system, and in particular, an apparatus and method for improving profiles produced by data collection readers is described in detail herein. In the following description, numerous specific details are set forth such as specific linear symbols and profiles therefrom, averaging, filtering and transforming techniques, an order and method of manipulating such profiles, etc., in order to provide a thorough understanding of the present invention. One skilled in the relevant art, however, will readily recognize that the present invention can be practiced without these specific details, or with other symbols, visual data, etc. In other instances, well-known structures are not shown in detail in order to avoid obscuring the present invention.

Figure 1:
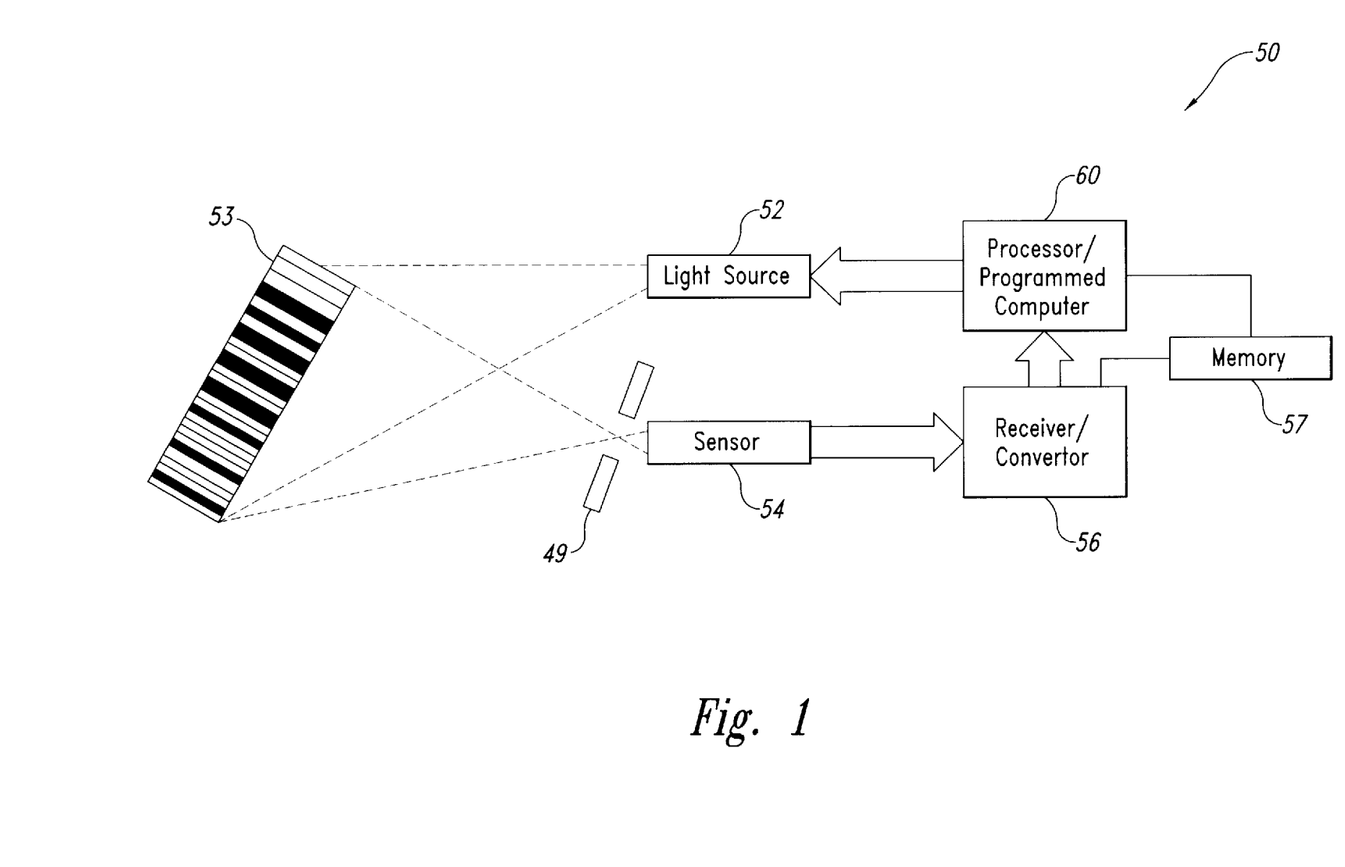
FIG. 1 is a block diagram of a preferred data collection symbology reader of the present invention with a plan view of a linear bar code symbol.
Figure 2:
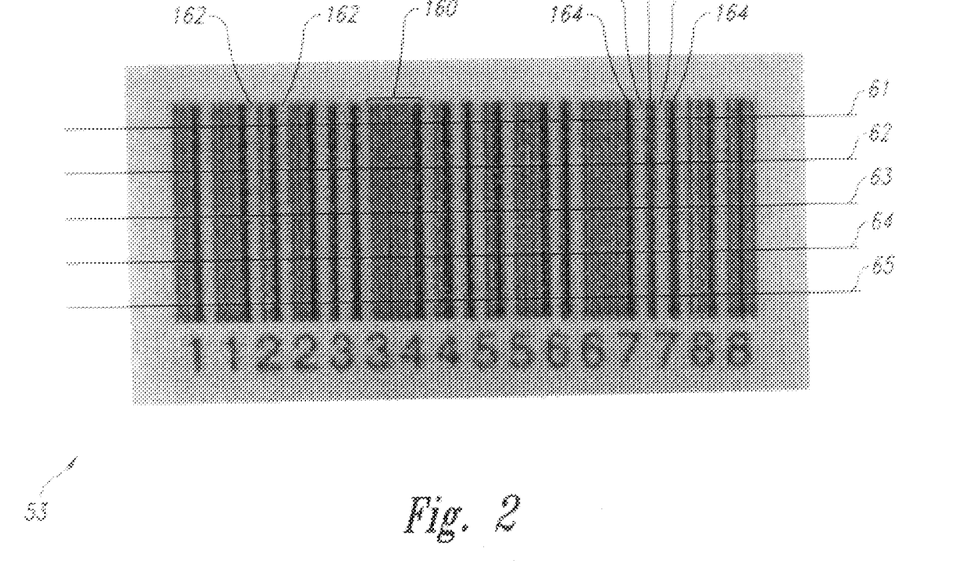
FIG. 2 is an out-of-focus image of a first linear bar code symbol produced by a CCD-type area reader.

As shown in FIG. 1, a data collection symbology reader 50 of the present invention includes a light source 52 that illuminates a data collection or other symbol, such as an interleaved 2 of 5 symbol 53 (shown more clearly in FIG. 2). As used herein, a "data collection symbol" refers to a symbol from any linear, stacked, area or other machine-readable symbology. A sensor 54 having an optical aperture 49, receives light reflected from the symbol 53 and converts the received light into an electrical signal or profile. For example, the light source 52 can be a rasterizing laser, while the sensor 54, in turn, can be a photodetector. Alternatively, the light source 52 can be an LED, flashbulb, infrared light source, or other light-emitting element, while the sensor 54 can be a one or two dimensional CCD, semiconductor array, vidicon, or other area imager capable of converting received light into electrical signals.

A receiver or converter 56 receives the electrical signal from the sensor 54 and converts into a signal to be processed by a programmed computer or processor 60. Typically, the sensor 54 produces an analog profile signal that represents the modulated light reflected from the elements in the symbol 53. Importantly, if the processor 60 is a digital computer, then the converter 56 converts the profile from an analog signal produced by the sensor 54 to a multi-level digital profile signal that numerically represents the various amplitudes of the analog signal. The converter 56 and/or processor 60 are coupled to memory 57 for storing the profile in digital form. The converter 56, memory 57 and processor 60 can be integrated on or in a single chip.

The sensor 54 is generally described below as a charge-coupled device ("CCD") or similar area imager having a active surface such as a rectangular surface of M by N pixel elements, e.g., 582 by 752 pixel elements. As is known, each pixel element in the CCD array of the sensor typically outputs a gray level signal, i.e., an analog signal that determines the amount or intensity of light impinging upon the particular pixel element, similar to a video data signal. The converter 56 preferably converts the gray level signal into a digital signal having, for example, 16 levels of gray for use by the processor 60. The memory 57 stores the digital signals, and preferably includes both volatile and non-volatile memory (e.g., random access and electrically, erasable read-only memory). As a result the reader 50 allows an object or image within the field of view of the sensor 54 to be converted into electrical signals that are digitized and stored, as a stored image in the random access portion of the memory 57 to be retrieved and processed by the processor 60 under a routine 100 stored in the read-only memory (as described below). After processing the stored image, the processor 60 can output the results of such processing to a peripheral apparatus or a computer (not shown).

For example, referring to FIG. 2, the symbol 53 within a stored image produced by the sensor 54 is "unresolved," as described below. Consequently, when the reader 50 analyzes a sampling path such as a sampling path 62 through the symbol 53, the reader produces an unresolved profile such as the profile shown in FIG. 3. The sixteen horizontal lines in FIG. 3 represent the sixteen thresholds or levels of gray, while the jagged or erratic waveform represents a discrete number of pixels or samples taken along the sampling path 62, as described more fully below.

Figure 3:
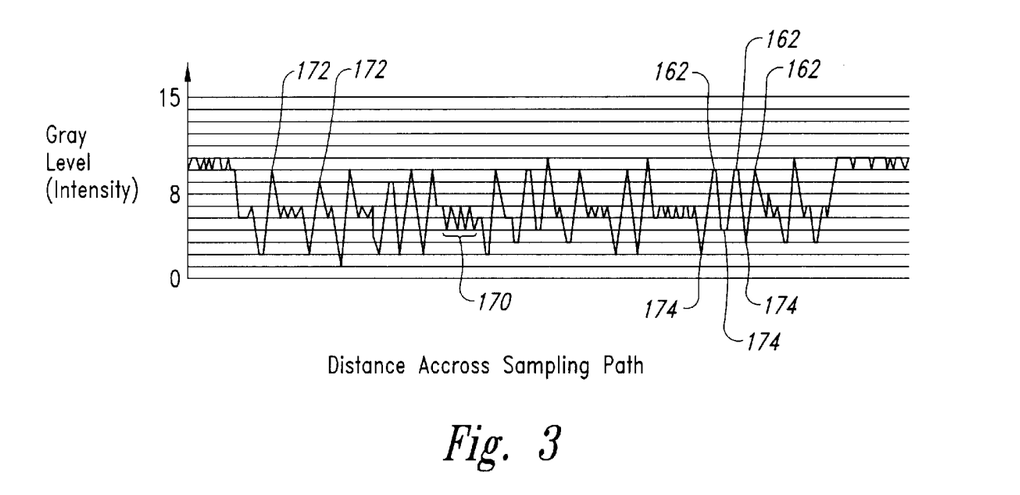
FIG. 3 is an exemplary profile produced by a sampling path or scan through the symbol of FIG. 2.

The profile of FIG. 3 is an example of a profile generated by a CCD type reader 50 having a low beta (e.g., 0.8). "Beta" is a ratio of the number of pixels to the number of modules used to image a symbol. A "module" is the narrowest nominal width of measure in a bar code symbology, and thus a module is generally equal to the X- dimension. Alternatively, the profile of FIG. 3 could be produced by imaging the symbol 53 beyond the depth-of-field of the reader 50, if the symbol were imaged by an unstable reader (e.g., a user with shaky hands), etc.

The routine 100 described below decodes profiles from a symbol where a given profile represents less than all of the bars and spaces or data cells in the symbol for the given sampling path. The shape of the profile produced by the reader 50 depends on the modulated light received from the symbol 53, and also other factors such as the size of the aperture 49 that precedes the light detector in the sensor 54, and whether the symbol 53 is in focus, contains printing defects, or is represented by signals having noise. The profile of FIG. 3 shows an "unresolved" profile, i.e., only wide shapes and spaces in the symbol 53 can be identified by a reader based on high peaks and low valleys in the profile, respectively. Positive ink spread, excessive noise, imaging a symbol out of its depth-of-field, etc., creates a profile that exhibits "closure." Closure in a profile is evidenced by some recognizable peaks and valleys, but also ripples toward the middle of the profile. Wider elements produce high peaks and low valleys in the closure profile, but the narrow elements are represented, if at all, by small peaks and valleys or ripples toward the middle of the profile. Current readers are unable to detect individual bars and spaces in such closure profiles.

The inventors have determined that as a reader produces profiles from an in-focus distance to an out-of-focus distance, where the beta for the reader changes, as printing defects increase, etc., the peaks and valleys from 1-wide elements are reduced to a gray level. For example, a series of 1-wide elements 160 in the symbol 53 of FIG. 2 produces multiple peaks and valleys 170 toward the middle of the profile of FIG. 3. Such peaks and valleys 170 do not accurately represent the 1-wide bars and spaces 160.

However, even when out-of-focus, the peaks and valleys in a profile produced by the wide elements are still resolved. For example, wide spaces 162 in the symbol 53 produce peaks 172 in the profile of FIG. 3, while wide bars 164 produce low valleys 174. More importantly, the positions of the peaks and valleys remain effectively constant as the profile becomes unresolved. As a result, the routine 100 of the present invention can still identify the centers of the recognizable peaks and valleys in the profile. Based on such centers distances, the processor 60 can employ one or more of the techniques developed by one of the co-inventors, as described in U.S. Pat. No. 5,389,770, entitled "Method and Apparatus for Decoding Unresolved Bar code Profiles," U.S. Pat. No. 5,486,689, entitled "Method and Apparatus for Decoding Unresolved Multi-Width Bar Code Symbology Profiles," and/or U.S. Pat. No. 5,514,858, entitled "Method and Apparatus for Decoding Unresolved Complex Multi-Width Bar Code Symbology Profiles," all of which are incorporated herein by reference.

Figure 4:
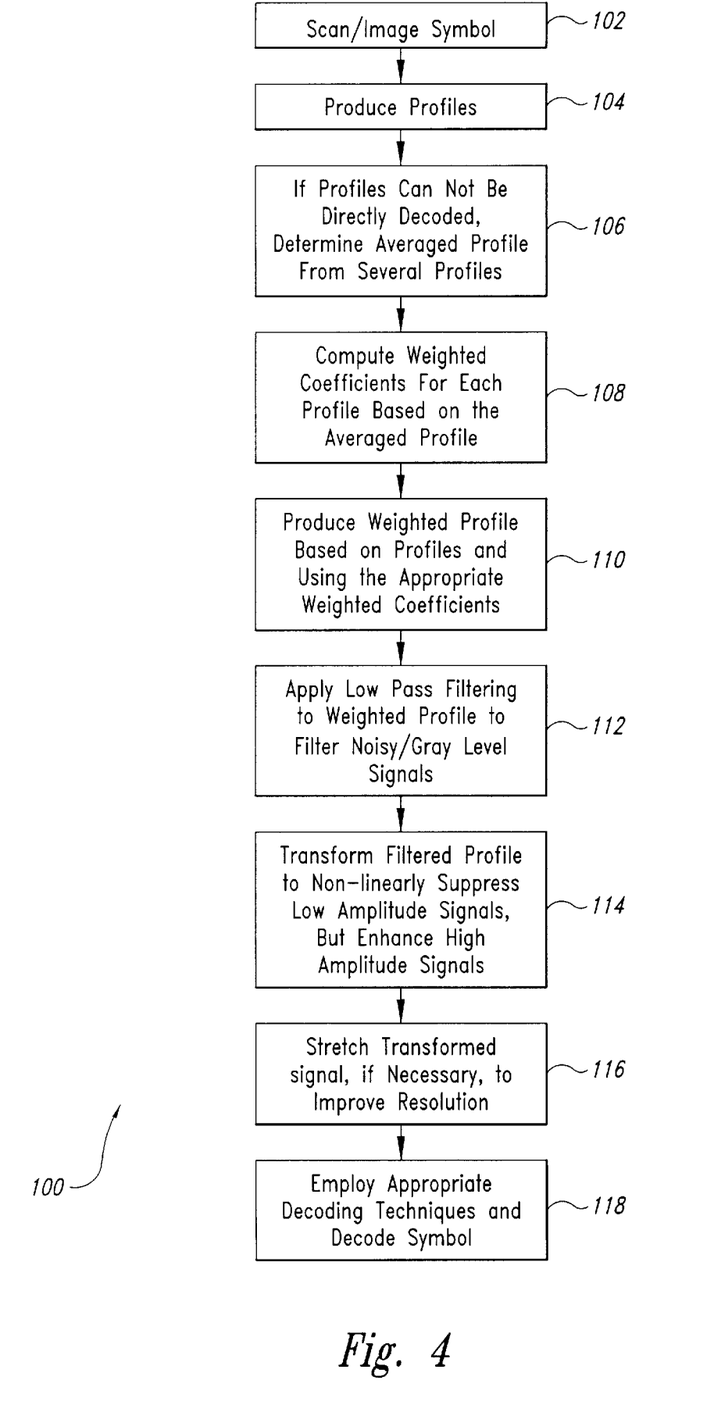
FIG. 4 is a flowchart of a preferred method of enhancing resolution of reflectance signals such as the profile of FIG. 3.

Referring to FIG. 4, the routine 100 performed by the reader 50 of the present invention first scans the symbol 53 or samples paths through and locates the symbol within a stored image. While the present invention is generally described herein as employing a CCD-type sensor 54 in the reader 50, the reader could also be a laser scanner, wand-based reader, or other reader. As used herein, the term "stored image" generally refers to the overall image of the field of view stored in the memory 57 that has been produced by the sensor 54 and the processor 60, and which contains the symbol 53 or other symbols to be decoded. For processing efficiency, if the CCD in the sensor 54 has an array of 582 by 752 pixels, then the memory 57 includes a 582 by 752 array of memory locations addressed by the processor 60 that correspond to the array of pixels.

The stored image in the memory 57 is preferably referenced by a Cartesian coordinate system so that the location of each pixel is represented by a pair of numbers indicating the horizontal and vertical position of the pixel in the stored image. For example, the first pixel in the top left corner of the stored image is assigned the Cartesian coordinates (0,0), while the bottom right-most pixel is assigned the coordinates (751, 581). Therefore, objects within the stored image, i.e., groups of pixels, can be arithmetically located using known geometric and trigonometric properties based on the coordinate system (e.g., equations of lines, circles, or other geometric or trigonometric equations used for representing planar objects). As used herein, the term "locates" generally refers to determining both the position and orientation of the image of an object within the stored image using conventional techniques.

The routine 100 begins in step 102 where the reader scans the symbol 53 or stores an image of, and locates, the symbol. For example, the reader 50 can be a hand-held product and include a trigger switch (not shown) coupled to the processor 60 that causes the light source 52 to illuminate the symbol 53, and allow the sensor 54, converter 56 and processor 60 to store an image of the symbol in the memory 57 upon actuation of the switch. The specific means and method for storing an image of a symbol by the reader 50 and locating the symbol are conventional and will be understood by those skilled in the relevant art without need for further description herein.

In step 104, the processor 60 begins to analyze the symbol 53 within the stored image. If the sensor 54 is an area image such as a CCD, then the processor 60 in step 104 analyzes one or more virtual scans or sampling paths taken through the stored image of the symbol 53. For example, the processor 60 analyzes five sampling paths 61–65 taken at regular intervals through the stored image of the symbol 53, perpendicular to the bars and spaces of the symbol. If the sensor 54 is a photodetector and the light source 52 is a rasterizing laser, then the processor 60 analyzes profiles that are generated from scan lines through the symbol 53 similar to the paths 61–65. The processor 60 either converts the sampling paths 61–65 to digital profiles, or preferably, the converter 56 has previously converted the analog profiles from the sensor 54 into digital profiles that are stored in the memory 57 for direct processing by the processor 60, without the need for the processor to perform additional steps. In other words, the processor 60 simply selects five rows (or columns) of memory cells in the memory 57 that correspond to rows (or columns) of digitized pixels from the stored image or field of view, and analyzes the selected rows as digital profiles. As a result, the terms "profile," "row of pixels," and "sampling path" are at times used interchangeably herein.

Referring to FIG. 3, an exemplary profile produced from the sampling path 62 is shown as having a continuous waveform. As noted above, the vertical scale of FIG. 3 represents the sixteen levels of gray produced by the CCD sensor 54 from zero or black to 15 or white. However, the vertical scale can represent a percent reflectance of light received from the symbol 53 ranging from 0% to 100%. The horizontal scale represents a position along the profile, or more particularly, the number of individual pixel elements in a series of pixel elements from which data is sampled. The horizontal scale need not be known absolutely, but rather can be in relative units, such as a distance across the symbol 53 or time allotted during the sampling path 62. When decoding a profile from a symbol, the processor 60 need not know the horizontal spacing in measurement units, but rather must know the relative widths or distances between elements represented by peaks or valleys in the profile.

Since the converter 56 of the reader 50 converts the field of view into 16 levels of gray, the profile of FIG. 3 has a less smooth profile, which is more jagged and discontinuous, as would typically be produced by the reader 50. The jaggedness in the profile of FIG. 3 is also due to the fact that a finite number of pixels were used to image the sampling path 62 through the symbol 53. Each "jag" is the result of plotting the reflectance value of one pixel.

Each pixel in the profile of FIG. 3 is a dot, and for visual purposes, the, profile is shown as a line interconnecting the dots. The processor 60, as described more fully below, analyzes a reflectance value of each pixel in the series of pixel elements,, where each pixel can have a reflectance value equal to an integer value between zero and 15.

Importantly, some readers produce high resolution reflectance profiles having at least 128 levels of gray and multiple pixels along each sampling path. However, many readers currently in production produce low resolution profiles having only 4 bits of information per pixel, which produces the exemplary 16 levels of gray discussed above. As a result, when such readers produce unresolved profiles, such profiles often cannot be decoded under the inventor's above noted techniques for decoding unresolved profiles. Moreover, with multi-width linear symbols, the inventor's techniques require knowledge of the widths of the wide elements when the 1-wide elements are unresolved or "lost." The present invention described in detail herein overcomes such problems by "artificially" enhancing the vertical (intensity) resolution of a poor resolution profile.

Referring back to FIG. 4, the processor 60 in step 106 first attempts to decode the symbol 53 based on one of the sampling paths 61–65. If the processor 60 cannot decode the symbol, then the processor determines an average profile P_av based on the five sampling paths 61–65. Mathematically, first let the unresolved profile be P_i[j], i=1, . . . , 5 and j=1, . . . , N, which represent the series or set of points from the five sampling paths 61–65 of FIG. 2. In other words, i corresponds to one of the five sampling paths 61–65, while j corresponds to each corresponding point or pixel along each path i from 1 (e.g., the left hand most pixel along each sampling path) to N (the right hand most pixel along each sampling path). Therefore, in step 106, for five sampling paths and for ∀j=1, . . . , N, the processor 60 calculates the average profile P_av based on the following equation:

$$P\_av[j] = \sum_{i=1}^{5} P\_i[j]/5.0 \qquad (1)$$

The present invention is described generally herein as employing five sampling paths 61–65. Fewer than five sampling paths could cause the processor 60 to be susceptible to averaging errors under equation (1) that can be produced by printing errors or erasures in the symbol 53, but could still be used beneficially. Five to seven sampling paths are preferred, while greater than eleven could require too much computation by the processor 60 with only an incremental benefit in enhancing the profile.

In step 108, the processor 60 computes weighted coefficients w[i,j] for each pixel along each of the five profiles based the averaged profile P_av[j] determined in step 106. Therefore, for ∀j=1, . . . , N and ∀i=1, . . . 5, the processor 60 determines:

$$w[i,j] = \exp(-\text{abs}(P\_av[j] - P\_i[j]) * \text{grad}) \qquad (2)$$

For example, for the first sampling path 61 (i=1), the processor 60 computes the weighted coefficients j=1, . . . N based on the following:

$$w[1,j] = \frac{1}{e^{(|av[j] - P\_i[j]| * 1.5)}} \qquad (3)$$

for a grading coefficient grad of 1.5. Under the equation (2), the intensity of each pixel in one of the five sampling paths 61–65 is compared with the average intensity value for that pixel among the five sampling paths. For example, if the thirty-second pixel along the first sampling path (i=1, j=31) has an intensity value of 3, but the average value for the thirty-first pixel along the paths has a value of 5, then w[1,31]=1/e$^3$, where grad is equal to 1.5. As a result, if a given pixel has a more extreme intensity value from the average, then it contributes less to the weighted coefficient under equation (2).

The constant grad is a gradient coefficient determined for the fixed value of gray scales. The grading coefficient grad represents a dynamic range between the light and dark pixels in the stored image of the symbol 53, or along the sampling paths 61–65. For example, if the distribution of the intensity of the pixels were plotted with intensity along the horizontal axis and number of pixels along the vertical axis, a typical binodal distribution results. The dynamic range typically indicates the amount of intensity distribution. If the dynamic range is large, then the gradient coefficient grad can equal one, such as when nearly all of the pixels are either light (having an intensity of approximately 12) or black (having an intensity of approximately 2). On the other hand, if the dynamic range is small such that the intensity of the pixels are distributed almost equally throughout the intensity scale, the gradient coefficient grad can be a value up to 10.

In step 110, the processor 60 produces a single weighted profile wp[j] from each of the five profiles and based on the appropriate weighted coefficients determined in step 108. Mathematically, the weighted profile produced based on the five of the sampling paths 61–65 (i.e., P_1[j] through P_5[j] are defined as follows:

$$wp[j]=(P\_1[j]*w[1,j]+P\_2[j]*w[2,j]+P\_3[j]*w[3,j]+P\_4[j]*w[4,j]+P\_5[j]*w[5,j])/\text{norm} \quad (4)$$

where the normalization value is equal to the sum of the weighted coefficients, i.e., norm=w[1,j]+w[2,j]+w[3,j]+w[4,j]+w[5,j], j=1, . . . , N.

Under steps 106–110, the processor 60 produces an enhanced resolution profile as the weighted profile wp[j], based on the five sampling paths 61–65. Under step 112, the processor 60 applies a low pass filtering to each of the weighted profiles wp[j] to filter noisy or gray level signals therefrom. The processor 60 in step 112 preferably employs a three point or pixel averaging filter on each of the weighted profiles wp[j] to produce a corresponding filtered weighted profile fwp[j] based on the following equation:

$$fwp[j]=0.33*wp[j-1]+0.33*wp[j]+0.33*wp[j+1] \quad (5)$$

Under equation (5), the intensity of each pixel is decreased by a value (e.g., 0.33) and added to the intensity of a decreased value of the adjacent pixels (i.e., pixels j−1 and j+1).

In general, the size of the filter (or window) depends on the size of the smallest x-dimension in the stored image of the symbol 53. If this smallest x-dimension is fairly large, such as ten pixels, then the processor 60 can use a larger filter of nine or eleven pixels, but generally, the three pixel averaging filter is acceptable. Furthermore, while such a filter is described above, other filters can be used. In step 112, the processor 60 extracts the portions of the profile corresponding to the wide elements, while suppressing the noise and gray level signals that typically correspond to the narrow or 1-wide elements in unresolved profiles. The wide elements typically produce lower frequency signals in a given profile, while the narrow elements produce higher frequency signals. Therefore, a low pass filter typically can filter out the narrow elements while passing the wide elements.

To further enhance the resolution of the wide elements, while suppressing the resolution of the narrow elements, the processor 60 increases the amplitude of the wide elements, while decreasing the amplitude of the narrow elements represented in each profile or sampling path by employing a non-linear function. In other words, the processor 60 in step 114 vertically stretches the filtered weighted profile fwp[j]. The present invention preferably employs trigonometric functions since they are so well known. Therefore, under step 114, the processor 60 transforms the filtered weighted profile fwp[j] to produce a transformed weighted profile twp[j] which nonlinearly suppresses low amplitude signals, but enhances high amplitude signals. The present invention preferably employs the following equation:

$$twp[j]=\sin(\pi/2*(fwp[j]-th)/(15-th)),$$

if fwp[j]>th, where th is equal to a global average value of the filtered weighted profile fwp[j], and $$twp[j]=\sin(\pi/2*(th-fwp[j])/(15-th)) \text{ if } fwp[j]<th. \quad (6)$$

Figure 5:
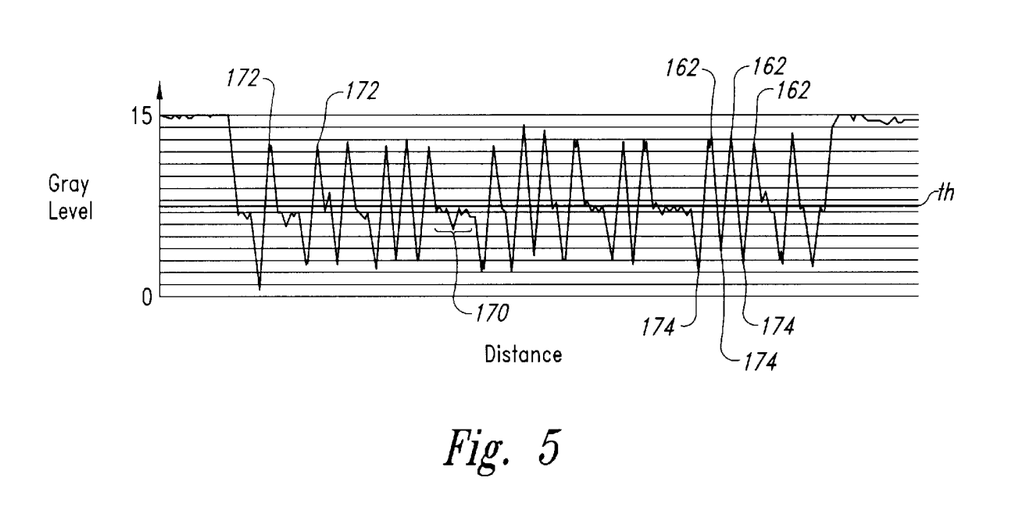
FIG. 5 is an exemplary profile produced by the method of FIG. 4 based on the profile of FIG. 3.

The constant th is a threshold value that can be determined simply by averaging the total intensity along each sampling path 61–65. The threshold value th is shown in FIG. 5 as the average intensity value for a filtered weighted profile fwp[j] for the profile of FIG. 3. As shown in FIG. 5, the threshold line th is approximately in the middle of the profile. The processor 60 can also apply an empirically derived coefficient to the threshold th based on the type of symbol (e.g., a linear symbol such as Code 128 versus a stacked symbology such as PDF 417).

Under equation (6) high peaks in the profile are accentuated or increased, while small peaks are decreased. In essence, small peaks have a smaller distance from the center threshold line th shown in FIG. 5, and thus result in a point in the transformed weighted profile twp[j] that is approximately equal to sin 0. If a point is equal to the threshold th, then it produces a value equal to zero (i.e., sin 0=0), while a point distant from the threshold th produces a value nearly equal to one (i.e., sin $(\pi/2)$=1).

In step 116, the processor 60 stretches the transformed weighted profile twp[j] onto the full interval of sixteen gray scale values 0–15. Such a stretching of the transformed weighted profile twp[j] further elongates the peaks and valleys of the wide elements. As a result, such peaks and valleys can be readily recognized by the processor 60, while the noise and unresolved 1-wide elements are suppressed. Overall, the resulting profile produced under the routine 100 is substantially similar to an unresolved profile produced by a reader having greater than sixteen levels of gray for each pixel, and multiple pixels along each path. FIG. 5 shows a resulting profile produced by the profile of FIG. 3 under the routine 100.

Figure 6:
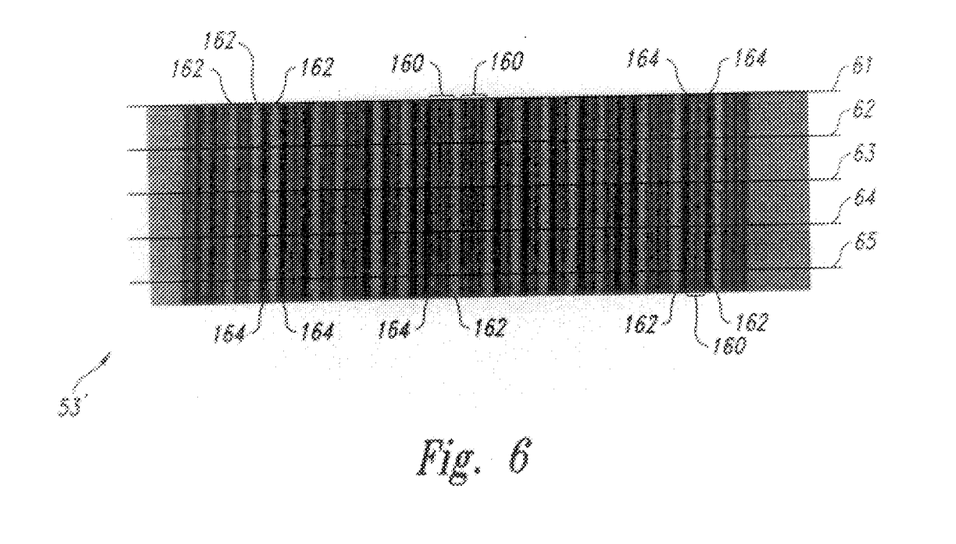
FIG. 6 is an out-of-focus image of a second linear bar code symbol produced by a CCD-type area reader.
Figure 7:
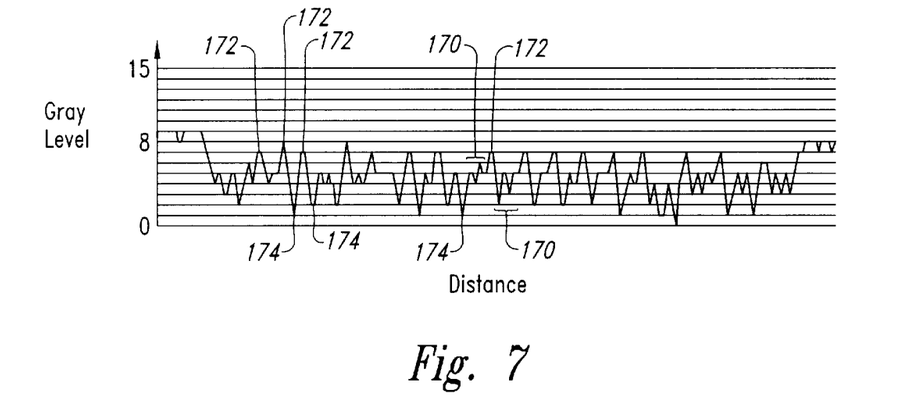
FIG. 7 is an exemplary profile produced by a sampling path or scan through the symbol of FIG. 6.
Figure 8:
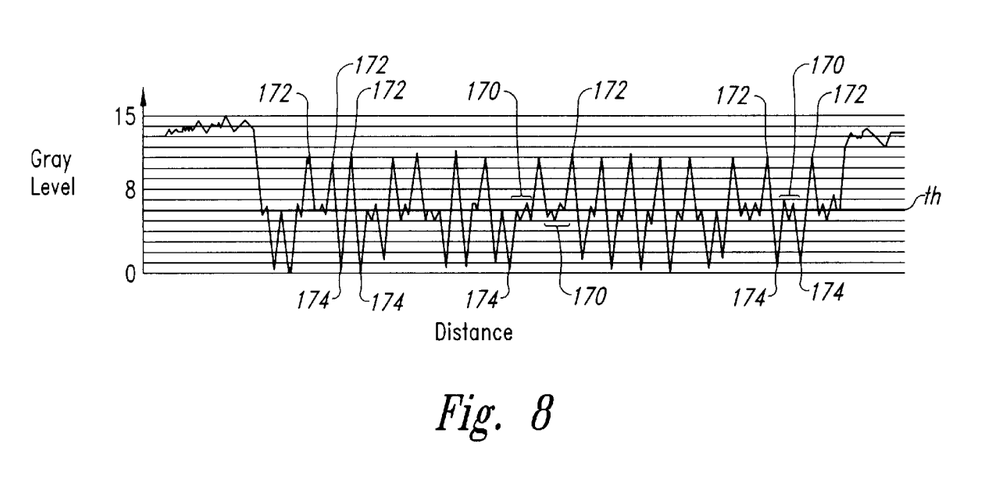
FIG. 8 is an exemplary profile produced by the method of FIG. 4 based on the profile of FIG. 7.

FIG. 6 shows another out-of-focus symbol 53'. Unresolved 1-wide elements 160 produce ripples 170 toward the middle of the profile of FIG. 7. However, wide spaces 162 and wide bars 164 still produce peaks 172 and valleys 174 in the profile of FIG. 7. The peaks and valleys 172 and 174 of FIG. 7 have less amplitude than those in the profile of FIG. 3, since the symbol 53' is more out-of-focus than the symbol 53. Nevertheless, under the routine 100, the processor 60 filters out the ripples 170, while exaggerating or lengthening the peaks 172 and valleys 174 as shown in the resulting profile of FIG. 8.

In step 118, the processor 60 employs one or more of the techniques described in the co-inventor's previously identified U.S. patents to (i) identify the higher peaks and lower valleys in the digitized profile, (ii) bound the peaks and valleys as resolved elements, and (iii) identify potential wide elements (e.g., 2-wide bars and spaces for a linear symbology such as Code 39). The processor 60 then verifies or identifies the width of each wide element and then measures distances between these wide elements. Alternatively, the processor 60 can identify the wide elements as having a lower frequency, or greater amplitude, from the remaining portions in the profile having higher frequency or greater amplitude that correspond to the unresolved narrow elements.

The processor 60 analyzes the profile and the measured distances, including start and stop characters, to determine a unit distance or X- dimension for the profile. Based on the unit distance, the processor 60 constructs a matrix for determining the number of narrow elements unresolved or "lost" between resolved wide elements. Based on the measured distances between resolved elements, all of the unresolved narrow elements are identified and the profile is subsequently decoded.

While the edges of elements may shift or become difficult to locate in unresolved profiles (especially using current edge finding circuitry), the centers of the elements remain substantially constant. Therefore, decoding symbols based on the centers of elements, rather than on the edges of the elements, provides a more robust and effective method of decoding symbols.

The routine 100 of the present invention can employ additional subroutines to further enhance locating and decoding of data collection symbols in a stored image. For example, the routine 100 can employ an auto discrimination routine that attempts to locate various types of defined portions (e.g., finder patterns and start/stop codes) from the string of center distances to thereby determine from which symbology the symbol was generated. Additionally, the routine 100 can correct for any acceleration or optical distortions that occurred during the generation of the stored image. Autodiscrimination routines and acceleration and optical distortion correction routines are known in the art, and therefore need not be described herein.

The present invention is, at times, described above graphically for ease of presentation and understanding. Those skilled in the art will recognize that the reader 50 of the present invention preferably does not graphically analyze and decode a given profile, but instead analyzes the values of individual pixel elements stored in the memory 57. While the present invention is described above as "sampling," "stretching," "measuring," etc. the present invention can analyze the profile by interpolating with respect to identified points in the profile, particularly when a finite number of pixels are used to generate the profile.

Accordingly, it can be appreciated by those skilled in the art that various equivalent modifications of the above-described embodiments may be made without departing from the spirit and scope of the invention. For example, while the present invention has been described above with respect to a method performed by the processor 60, the routine 100 can be implemented using appropriate circuitry, such as averaging circuits, thresholding circuits, etc. Additionally, signal or profile processing circuits can employ only portions of the present invention for signal enhancement, such as only the averaging and weighting functions (steps 106–110) for profile enhancement or the filtering and signal stretching functions (steps 112–116).

While the present invention is generally described above as generating an enhanced profile from a linear symbol, the present invention can be equally applied to generating an improved reflectance signal from other images. For example, if a stacked symbol were decoded under the present invention, then multiple paths must be formed through each row of elements in the stacked symbol. Although specific inventions of, and examples for, the present invention are described herein for illustrative purposes, various other equivalent modifications can be made. The teachings provided herein of the present invention can be applied to other signal analysis systems, not necessarily the machine-readable profile analysis system described in detail above.

These and other changes can be made to the invention light of the above detailed description. In general, in the following claims, the terms used should not be construed to limit the invention to the specific embodiments disclosed in the specification and the claims, but should be construed to include any machine vision system, or signal processing system, that operates in accordance with the claims to provide improved signals. Accordingly, the invention is not limited by the disclosure, but instead its scope is to be determined entirely by the following claims.

We claim:

1. A method of decoding a machine-readable symbol representing encoded information, the symbol including a plurality of selectively spaced bars, the bars and spaces between the bars having at least a narrow and a wide width in at least one dimension, the method comprising the steps of:

producing a plurality of reflectance signals based on light reflected from the symbol, the plurality of reflectance signals having valleys and peaks that represent the reflectance of the bars and spaces having the wide width, but failing to resolve at least some of the bars and spaces having the narrow width;

averaging the plurality of reflectance signals to produce an average profile;

computing weighting coefficients for at least one of the plurality of reflectance signals based on the averaged profile;

producing a weighted profile for at least one of the plurality of reflectance signals based on the weighting coefficients;

filtering the weighted profile to produce a filtered profile;

transforming the filtered profile to enhance the peaks and valleys that represent the bars and spaces having the wide width, to produce a transformed profile; and decoding the information encoded in the symbol based on the transformed profile.

2. The method of claim 1 wherein the step of producing a plurality of reflectance signals includes the step of producing the plurality of reflectance signals as multiple level digital signals.

3. The method of claim 1 wherein the plurality of reflectance signals are represented by $P\_[i,j]$, having a number i of profiles, and a number j of pixels in each profile, wherein each pixel in the average profile is represented by $av[j]$, wherein the step of computing weighted coefficients includes computing each coefficient $w[i,j]$ based on an equation $$w[i,j] = \frac{1}{e^{(|av[j] - P\_i[j]| * grad)}},$$

and wherein grad is a constant representing an overall intensity contrast of the symbol.

4. The method of claim 1 wherein the plurality of reflectance signals are represented by $P\_[i,j]$, having a number i of profiles, and a number j of pixels in each profile wherein each pixel in the weighted profile is represented by $wp[j]$, and wherein the step of filtering the weighted profile includes filtering the weighted profile based on an equation $$fwp[j] = 0.33 * wp[j-1] + 0.33 * wp[j] + 0.33 * wp[j+1].$$

5. The method of claim 1 wherein the plurality of reflectance signals are represented by $P\_[i,j]$, having a number i of profiles, and a number j of pixels in each profile, wherein each pixel in the filtered profile is represented by fwp[j], and wherein the step of transforming the filtered profile includes the steps of:

determining a threshold intensity value th for the symbol;

transforming the filtered profile based on an equation twp[j]=sin($\pi$/2*(fwp[j]−th)/(Int−th)), if the intensity of a given pixel fwp[j] is greater than the threshold value th, and twp[j]=sin($\pi$/2*(th−fwp[j])/(Int−th)) if the intensity of the given pixel fwp[j] is less than the threshold value th, wherein the value Int is a highest intensity value in the weighted profile; and stretching the transformed profile to a range of the number of intensity values.

6. The method of claim 1, further comprising the step of producing a stored image of the symbol; and wherein the step of producing a plurality of reflectance signals produces a plurality of sampling paths through the stored image.

7. The method of claim 1 wherein the step of decoding includes the steps of:

measuring distances between centers of the peaks and valleys that represent the bars and spaces having the wide width in the transformed profile;

creating a lost element matrix that identifies a number of the bars and spaces having the narrow width that are unresolved between the wide bars and spaces; and determining a number and location of the bars and spaces having the narrow width by comparing the distances measured to the lost element matrix.

8. A method of decoding a data collection symbol representing encoded information, the symbol including a plurality of spaced two-dimensional shapes with spaces between the shapes, the method comprising the steps of:

producing a plurality of reflectance signals based on light reflected from the symbol, the plurality of reflectance signals having valleys and peaks that represent the reflectance of the shapes and spaces comprising the symbol;

producing an enhanced resolution profile based on the plurality of profiles;

transforming the enhanced resolution profile to exaggerate the peaks and valleys that represent the shapes and spaces comprising the symbol, to produce a transformed profile; and decoding the information encoded in the symbol based on the transformed profile.

9. The method of claim 8 wherein the step of producing an enhanced resolution profile includes the steps of:

averaging the plurality of reflectance signals to produce an average profile;

computing weighting coefficients for at least one of the plurality of reflectance signals based on the averaged profile; and producing a weighted profile for at least one of the plurality of reflectance signals based on the weighting coefficients.

10. The method of claim 8 wherein the plurality of reflectance signals have valleys and peaks that represent the reflectance of the shapes and spaces having a wide width, but failing to resolve at least some of the shapes and spaces having a narrow width, and wherein the step of transforming the enhanced resolution profile includes the steps of:

filtering the enhanced resolution profile to produce a filtered profile; and transforming the filtered profile based on a non-linear function to enhance the peaks and valleys that represent the shapes and spaces having the wide width and suppress the peaks and valleys that represent the shapes and spaces having the narrow width, to produce the transformed profile.

11. The method of claim 8 wherein the plurality of reflectance signals are represented by P_[i,j], having a number i of profiles, and a number j of pixels in each profile, wherein the step of producing an enhanced resolution profile includes the steps of:

averaging the plurality of reflectance signals to produce an average profile, wherein each pixel in the average profile is represented by av[j];

computing weighting coefficients w[i,j] for at least one of the plurality of reflectance signals, wherein each coefficient w[i,j] is based on an equation $$w[i,j] = \frac{1}{e^{(|av[j]-P\_i[j]|*grad)}},$$

wherein grad is a constant; and producing a weighted profile for at least one of the plurality of reflectance signals based on the weighting coefficients w[i,j].

12. The method of claim 8 wherein the plurality of reflectance signals are represented by P_[i,j], having a number i of profiles, and a number j of pixels in each profile, and wherein the step of transforming the enhanced resolution profile includes the steps of:

producing a weighted profile for at least one of the plurality of reflectance signals, wherein each pixel in the weighted profile is represented by wp[j]; and filtering the weighted profile based on an equation $$fwp[j]=0.33*wp[j-1]+0.33*wp[j]+0.33*wp[j+1].$$

13. The method of claim 8 wherein step of transforming the enhanced resolution profile includes the step of filtering the enhanced profile based on a low pass filter.

14. The method of claim 8 wherein the plurality of reflectance signals are represented by P_[i,j], having a number i of profiles, and a number j of pixels in each profile, and wherein the step of transforming the enhanced resolution profile includes the steps of:

producing a filtered profile for at least one of the plurality of profiles, wherein each pixel in the filtered profile is represented by fwp[j];

determining a threshold intensity value th for the symbol; and transforming the filtered profile based on an equation twp[j]=sin($\pi$/2*(fwp[j]−th)/(Int−th)), if the intensity of a given pixel fwp[j] is greater than the threshold value th, and twp[j]=sin($\pi$/2*(th−fwp[j])/(Int−th)) if the intensity of the given pixel fwp[j] is less than the threshold value th, wherein the value Int is a highest intensity value in the filtered profile.

15. A method of producing a signal from a data collection symbol representing encoded information, the symbol including a plurality of spaced two-dimensional shapes with spaces between the shapes, the method comprising the steps of:

producing a plurality of reflectance signals based on light reflected from the symbol, the plurality of reflectance signals having valleys and peaks that represent the reflectance of the shapes and spaces comprising the symbol;

producing an enhanced resolution profile based on the plurality of profiles; and transforming the enhanced resolution profile to exaggerate the peaks and valleys that represent the shapes and spaces comprising the symbol, to produce a transformed profile.

16. The method of claim 15 wherein the step of producing an enhanced resolution profile includes the steps of:

averaging the plurality of reflectance signals to produce an average profile;

computing weighting coefficients for at least one of the plurality of reflectance signals based on the averaged profile; and producing a weighted profile for at least one of the plurality of reflectance signals based on the weighting coefficients.

17. The method of claim 15 wherein the plurality of reflectance signals having valleys and peaks that represent the reflectance of the shapes and spaces having a wide width, but failing to resolve at least some of the shapes and spaces having a narrow width, and wherein the step of transforming the enhanced resolution profile includes the steps of:

filtering the enhanced resolution profile to produce a filtered profile; and transforming the filtered profile based on a non-linear function to enhance the peaks and valleys that represent the shapes and spaces having the wide width and suppress the peaks and valleys that represent the shapes and spaces having the narrow width, to produce the transformed profile.

18. The method of claim 15 wherein the plurality of reflectance signals are represented by P_[i,j], having a number i of profiles, and a number j of pixels in each profile, wherein the step of producing an enhanced resolution profile includes the steps of:

averaging the plurality of reflectance signals to produce an average profile, wherein each pixel in the average profile is represented by av[j];

computing weighting coefficients w[i,j] for at least one of the plurality of reflectance signals, wherein each coefficient w[i,j] is based on an equation $$w[i,j] = \frac{1}{e^{(|av[j]-P\_i[j]|*grad)}},$$

wherein grad is a constant; and producing a weighted profile for at least one of the plurality of profiles based on the weighting coefficients w[i,j].

19. The method of claim 15 wherein the plurality of reflectance signals are represented by P_[i,j], having a number i of profiles, and a number j of pixels in each profile, and wherein the step of transforming the enhanced resolution profile includes the steps of:

producing a weighted profile for at least one of the plurality of reflectance signals, wherein each pixel in the weighted profile is represented by wp[j]; and filtering the weighted profile based on an equation $$fwp[j]=0.33*wp[j-1]+0.33*wp[j]+0.33*wp[j+1].$$

20. The method of claim 15 wherein step of transforming the enhanced resolution profile includes the step of filtering the enhanced profile based on a low pass filter.

21. The method of claim 15 wherein the plurality of reflectance signals are represented by P_[i,j], having a number i of profiles, and a number j of pixels in each profile, and wherein the step of transforming the enhanced resolution profile includes the steps of:

producing a filtered profile for at least one of the plurality of profiles, wherein each pixel in the filtered profile is represented by fwp[j];

determining a threshold intensity value th for the symbol; and transforming the filtered profile based on an equation twp[j]=sin($\pi$/2*(fwp[j]−th)/(Int−th)), if the intensity of a given pixel fwp[j] is greater than the threshold value th, and twp[j]=sin($\pi$/2*(th−fwp[j])/(Int−th)) if the intensity of the given pixel fwp[j] is less than the threshold value th, wherein the value Int is a highest intensity value in the filtered profile.

22. A method of enhancing a signal comprising the steps of:

producing a plurality of similar signals, each signal having valleys and peaks that represent information, but each signal having noise, the noise having an amplitude or frequency that differs from an amplitude or frequency of the valleys and peaks;

averaging the plurality of signals to produce an average signal;

computing weighting coefficients for at least one of the plurality of signals based on the averaged signal;

producing a weighted signal for at least one of the plurality of signals based on the weighting coefficients;

filtering the weighted signal to produce a filtered signal; and transforming the filtered signal to enhance the peaks and valleys.

23. A method of decoding a machine-readable symbol representing encoded information, the symbol including a plurality of selectively spaced shapes, the shapes and spaces between the shapes having at least a narrow and a wide width in at least one dimension, the method comprising the steps of:

producing a plurality of reflectance signals based on light reflected from the symbol, the plurality of reflectance signals having valleys and peaks that represent the reflectance of at least the shapes and spaces having the wide width;

averaging the plurality of reflectance signals to produce an average profile;

computing weighting coefficients for at least one of the plurality of reflectance signals based on the averaged profile;

producing a weighted profile for at least one of the plurality of reflectance signals based on the weighting coefficients; and decoding the information encoded in the symbol based on the weighted profile.

24. The method of claim 23 wherein the step of producing a plurality of reflectance signals includes the step of producing the plurality of reflectance signals as multiple level digital signals.

25. The method of claim 23 wherein the plurality of reflectance signals are represented by P_[i,j], having a number i of profiles, and a number j of pixels in each profile, wherein each pixel in the average profile is represented by av[j], wherein the step of computing weighted coefficients includes computing each coefficient w[i,j] based on an equation $$w[i,j] = \frac{1}{e^{(|av[j]-P\_i[j]|*grad)}},$$

and wherein grad is a constant representing an overall intensity contrast of the symbol.

26. The method of claim 23, further comprising the step of producing a stored image of the symbol; and wherein the step of producing a plurality of reflectance signals produces a plurality of sampling paths through the stored image.

27. The method of claim 23 wherein the step of decoding includes the steps of:

measuring distances between centers of the peaks and valleys that represent the shapes and spaces having the wide width in the weighted profile;

creating a lost element matrix that identifies a number of the shapes and spaces having the narrow width that are unresolved between the wide shapes and spaces; and determining a number and location of the shapes and spaces having the narrow width by comparing the distances measured to the lost element matrix.

28. A method of decoding a machine-readable symbol representing encoded information, the symbol including a plurality of selectively spaced bars, the bars and spaces between the bars having at least a narrow and a wide width in at least one dimension, the method comprising the steps of:

producing at least one reflectance signal based on light reflected from the symbol, the reflectance signal having valleys and peaks that represent the reflectance of at least the bars and spaces having the wide width;

filtering the reflectance signal to produce a filtered profile;

transforming the filtered profile to enhance the peaks and valleys that represent the bars and spaces having the wide width, to produce a transformed profile; and decoding the information encoded in the symbol based on the transformed profile.

29. The method of claim 28 wherein a plurality of reflectance signals are represented by P_[i,j], having a number i of profiles, and a number j of pixels in each profile, and wherein the step of filtering the reflectance signal includes the steps of:

producing a weighted profile based on the reflectance signal, wherein each pixel in the weighted profile is represented by wp[j]; and filtering the weighted profile based on an equation $fwp[j]=0.33*wp[j-1]+0.33*wp[j]+0.33*wp[j+1]$.

30. The method of claim 28 wherein a plurality of reflectance signals are represented by P_[i,j], having a number i of profiles, and a number j of pixels in each profile, wherein each pixel in the filtered profile is represented by fwp[j], and wherein the step of transforming the filtered profile includes the steps of:

determining a threshold intensity value th for the symbol;

transforming the filtered profile based on an equation twp[j]=sin(π/2*(fwp[j]–th)/(Int–th)), if the intensity of a given pixel fwp[j] is greater than the threshold value th, and twp[j]=sin(π/2*(th–fwp[j])/(Int–th)) if the intensity of the given pixel fwp[j] is less than the threshold value th, wherein the value Int is a highest intensity value in the weighted profile; and stretching the transformed profile to a range of the number of intensity values.

31. An apparatus for decoding a machine-readable symbol representing encoded information, the machine-readable symbol including a plurality of selectively spaced two-dimensional shapes, the apparatus comprising:

a sensor that receives light that is reflected from the machine-readable symbol and produces a plurality of output signals therefrom that represent the reflectance of the shapes and spaces comprising the symbol;

a receiver that receives the output signals and produces a plurality of reflectance signals having peaks and valleys indicative of at least some of the shapes and spaces; and a processor for processing the plurality of reflectance signals and producing a signal indicative of the information encoded in the symbol, the processor (a) producing an enhanced resolution profile based on the plurality of reflectance signals, (b) transforming the enhanced resolution profile to exaggerate the peaks and valleys indicative of the shapes and spaces comprising the symbol and producing a transformed profile, and (c) decoding the information encoded in the symbol based on the transformed profile.

32. The apparatus of claim 31 wherein the processor averages the plurality of reflectance signals to produce an average profile, computes weighting coefficients for at least one of the plurality of reflectance signals based on the averaged profile, and produces a weighted profile for at least one of the plurality of reflectance signals based on the weighting coefficients.

33. The apparatus of claim 31 wherein the plurality of reflectance signals have valleys and peaks that represent the reflectance of the shapes and spaces having a wide width, but failing to resolve at least some of the shapes and spaces having a narrow width, and wherein the processor filters the enhanced resolution profile to produce a filtered profile, and transforms the filtered profile based on a non-linear function to enhance the peaks and valleys that represent the shapes and spaces having the wide width and suppress the peaks and valleys that represent the shapes and spaces having the narrow width, to produce the transformed profile.

34. The apparatus of claim 31 wherein the plurality of reflectance signals are represented by P_[i,j], having a number i of profiles, and a number j of pixels in each profile, and wherein the processor averages the plurality of reflectance signals to produce an average profile, wherein each pixel in the average profile is represented by av[j], computes weighting coefficients w[i,j] for at least one of the plurality of profiles, wherein each coefficient w[i,j] is based on an equation $$w[i,j] = \frac{1}{e^{(|av[j]-P\_i[j]|*grad)}},$$

wherein grad is a constant, and produces a weighted profile for at least one of the plurality of profiles based on the weighting coefficients w[i,j].

35. The apparatus of claim 31 wherein the plurality of reflectance signals are represented by P_[i,j], having a number i of profiles, and a number j of pixels in each profile, and wherein the processor produces a weighted profile for at least one of the plurality of profiles, wherein each pixel in the weighted profile is represented by wp[j], and filters the weighted profile based on an equation $fwp[j]=0.33*wp[j-1]+0.33*wp[j]+0.33*wp[j+1]$.

36. The apparatus of claim 31 wherein the processor filters the enhanced profile based on a low pass filter.

37. The apparatus of claim 31 wherein the plurality of reflectance signals are represented by P_[i,j], having a number i of profiles, and a number j of pixels in each profile, and wherein the processor produces a filtered profile for at least one of the plurality of profiles, wherein each pixel in the filtered profile is represented by fwp[j], determines a threshold intensity value th for the symbol, and transforms the weighted profile based on an equation twp[j]=sin($\pi$/2* (fwp[j]−th)/(Int−th)), if the intensity of a given pixel fwp[j] is greater than the threshold value th, and twp[j]=sin($\pi$/2* (th−fwp[j])/(Int−th)) if the intensity of the given pixel fwp[j] is less than the threshold value th, wherein the value Int is a highest intensity value in the filtered profile.

* * * * *